Feb. 17, 1948.                W. SWERDLOFF                2,436,367
                           ISOMERIZATION PROCESS
                             Filed Nov. 6, 1944
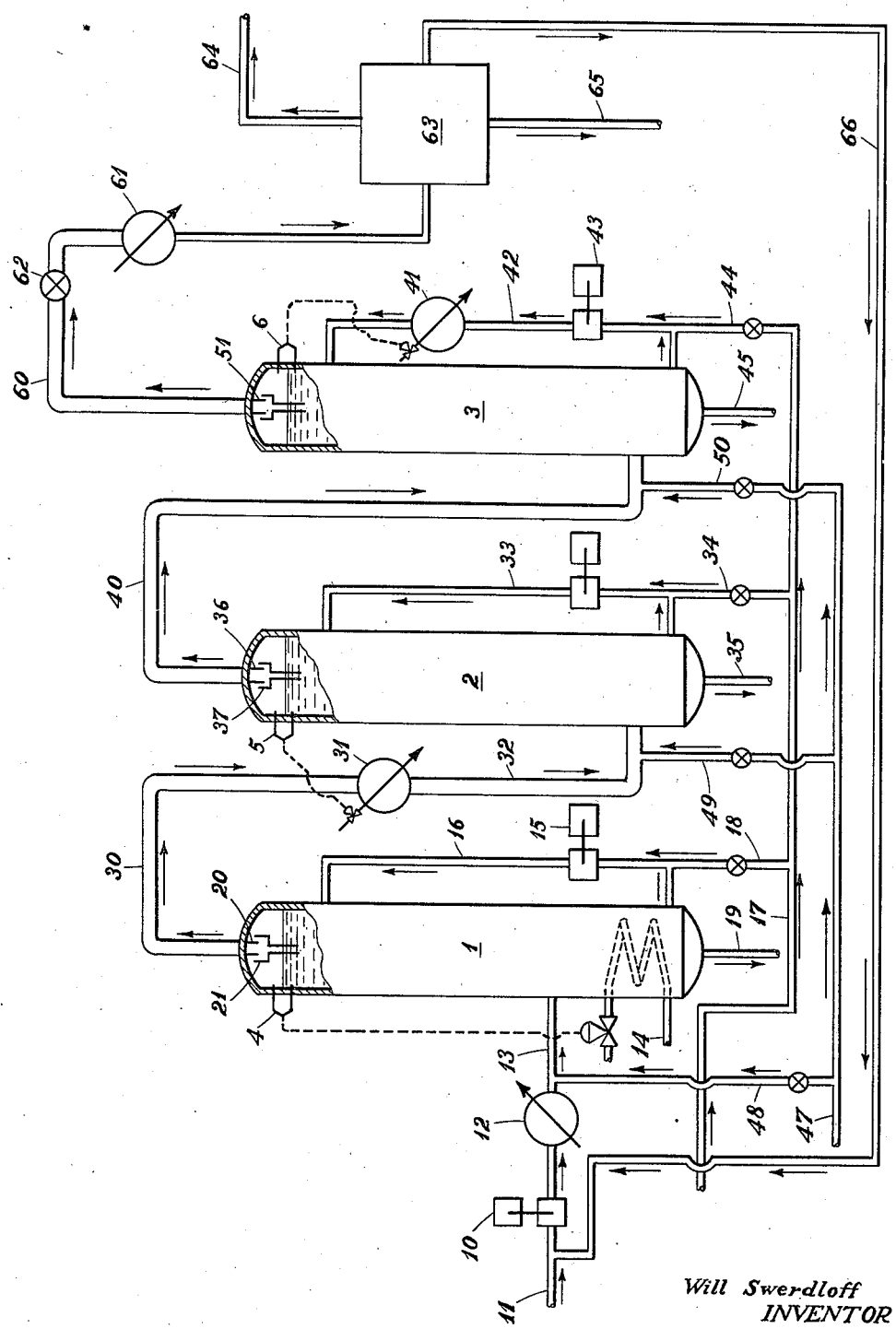
Will Swerdloff
INVENTOR
BY John C. Stauffer
ATTORNEY Patented Feb. 17, 1948

2,436,367

UNITED STATES PATENT OFFICE 2,436,367

ISOMERIZATION PROCESS

Will Swerdloff, Dallas, Tex., assignor, by mesne assignments, to Socony-Vacuum Oil Company, Incorporated, New York, N. Y., a corporation of New York Application November 6, 1944, Serial No. 562,108

9 Claims. (Cl. 260—683.5)

The present invention relates to an improved method for isomerizing normal paraffinic hydrocarbons in the liquid phase with the aid of hydrocarbon soluble catalysts. More particularly, this invention relates to an improved method for isomerizing normal paraffins of from four to seven carbon atoms with the aid of aluminum bromide catalyst, the process being carried out in separate stage reactors.

The isomerization of paraffin hydrocarbons, particularly normal butane by means of hydrocarbon soluble catalysts such as aluminum bromide is well known. Isomerization is a reversible reaction and, as the amount of branched chain isomer product formed increases in the reaction mixture, the rate of reaction slows down. Various methods of increasing the rate of isomerization as the concentration of the isomer builds up and as the activity of the catalyst goes down have been suggested. For example, one method is to separate the conversion into stages and to increase the temperature of the reactant in the secondary and succeeding reaction zones in order to compensate for reduced catalyst activity. Another method is to increase the amount of catalyst promoter in the latter stages. I have taught and claimed in my co-pending application entitled Hydrocarbon conversion process, Serial 527,185, filed March 20, 1944, a third method involving the increase in concentration of the aluminum bromide catalyst as the reaction slows down.

The use of hydrocarbon soluble aluminum bromide catalyst for isomerizing straight chain paraffins to branched chain paraffins, particularly for converting normal butane to isobutane in liquid phase operation, has certain advantages particularly if the conversion is carried out in separate stages. Better contact of the catalyst with the normal butane reactant is obtainable than in processes utilizing relatively insoluble catalyst such as aluminum chloride. However, in utilizing separate stages there are certain disadvantages among which is the concentration of too large amounts of catalyst in a latter stage or stages which results from the heretofore procedure of transferring the reaction mixture from the primary reaction zone to the secondary reaction zone and thence to succeeding stage reaction zones as a liquid. As this solution of catalyst becomes more concentrated it becomes more difficult to handle, not only in pumping to provide circulation and contact in the last stage of conversion but particularly in pumping from the catalyst concentrator from which the isomerized product is flashed following the last stage of conversion. This method of catalyst concentration is described in the above co-pending application. The chief difficulty in pumping the highly concentrated solution of catalyst is that the concentrated solution tends to foul packing glands as a result of deposition of precipitated catalyst.

It is an object of the present invention to carry out the isomerization of paraffinic hydrocarbons in the presence of hydrocarbon soluble catalyst in stages in such a manner that the catalyst will not be concentrated in the latter stages of the conversion process. Another object of this invention is to transfer the hydrocarbon reactant and product of conversion from the primary stage reactor to succeeding stage reactors in a multi-stage isomerization process employing a soluble catalyst, in a fluid stream substantially free of said soluble catalyst. A further object of the invention is to operate a multi-stage butane isomerization process utilizing hydrocarbon soluble aluminum bromide catalyst in such a manner that the transfer of butanes from the reaction zones is made substantially in the vapor phase. An additional object of the invention is to operate a multi-stage butane isomerization process utilizing aluminum bromide catalyst in such a manner that no separate catalyst concentration step is required for the separation of the soluble catalyst from the product for recycle to the reactors.

To accomplish these objects, as well as other objects, which will be apparent from a full understanding of the invention to be more fully described, I propose to operate the series of two or more reaction stages maintaining a temperature and pressure gradient between each of these stages, the highest temperature and pressure being maintained in that reactor to which fresh feed is initially admitted. A feed stock comprising, for example, predominantly normal butane, containing from about 1 mol percent to about 5 mol percent of aluminum bromide, is passed to the primary reaction zone which is preferably a tower packed with inert material such as unglazed ceramic ware. The liquid normal butane in the primary reaction zone is partially converted to isobutane. The product is vaporized and isobutane vapors together with unconverted butane vapors pass overhead to a second reaction zone where the temperature and pressure are preferably maintained at somewhat lower level. Vapors more highly enriched with respect to isobutane from the second reaction zone may be transferred to a third reaction zone which is operated in the same manner as the second reaction zone except that a lower temperature and a lower pressure may be maintained than in the second zone. The vapor product from the third or last zone is passed to a fractionation system for recovery of isobutane and for the separation of normal butane recycle.

Referring to the drawing, towers 1, 2 and 3 are a series of reactors, preferably packed with inert ceramic ware. These reactors are operated substantially full of liquid butane containing about 2.5 mol percent of dissolved aluminum bromide catalyst and liquid level controllers 4, 5 and 6, which control the rate of vaporization or discharge from the towers as hereinafter described, are provided to maintain substantially the same level of liquid butane in the three towers. Fresh normal butane feed is passed by means of pump 10 in line 11 through heater 12 where it is heated to a temperature preferably within the range of 200° F. and 250° F. From heater 12 the hot butane stream passes via line 13 to reaction tower 1, which may be operated at a temperature within the range of 175° F. and 275° F. and at a pressure just sufficient to maintain liquid phase conversion. Although the isomerization of normal butane to isobutane is slightly exothermic, sufficient heat must be supplied to reaction tower 1 to continuously vaporize the butane product and hence heating means 14 is provided at the base of tower 1.

The rate of evaporation from tower 1 is controlled by level controller 4 which regulates the heat available for evaporation. The maximum residence time for which the system can be operated is determined by the dimensions and number of the reaction vessels. Shorter residence times can be obtained by lowering the liquid level maintained in the reaction vessel. Total overall residence times of from about one-half hour to about ten hours for the series of reactors are suitable, choice within this range depending on the activity of the catalyst as affected by temperature, concentration of catalyst and catalyst promoter, and efficiency of contact of the promoter with the reactant butane and dissolved catalyst. Intimate contact is obtained by circulation of the reactant provided by pump 15 in circulating line 16. Fresh aluminum bromide catalyst is provided through line 17 and line 18 which connects with circulating line 16, the fresh catalyst being added to replace spent catalyst which is withdrawn as an insoluble tar through bottom drawoff line 19.

The vapor from tower 1 consists of a mixture of isobutane product and unconverted normal butane. The vapor is stripped of entrained liquid by baffle 20 and the liquid is collected and returned to the reaction mass by drip pan 21. The vapor passes from tower 1, through overhead line 30, condenser 31 and line 32 to tower 2 which is operated at somewhat lower temperature and pressure than tower 1. The temperature in tower 2 may be maintained within the range of from about 175° F. to about 250° F. and at a pressure sufficient to maintain the reactants in the liquid phase. The average temperature in tower 2 will usually be from 5° to 35° F. lower than the temperature in tower 1. A part of the vapor in line 30 may be condensed in condenser 31, this method being used to withdraw the exothermic heat of the isomerization reaction from the system. Heat is withdrawn from the vapors by controlled flow of coolant through condenser 31, at least a part of the vapors being condensed and the flow of coolant being regulated in cooperation with liquid level controller 5 at the top of tower 2. The amount of cooling and condensing may be regulated by liquid level fluctuation in tower 2. If desired, condenser 31 may be omitted in which case the vapors pass through line 32 and are introduced directly to tower 2. Either of these methods of operation permits utilization of the heat of condensation of the gaseous product to vaporize isobutane and unconverted normal butane in tower 2. Mixing and contacting of the reactants with catalyst and promoter are improved by omission of condenser 31. The bubbles of rising vapor serve to agitate the contents of the tower, especially near the bottom, before they are completely absorbed in the liquid reactant. When operating with no condensation of vapors from tower 1, excess heat is removed from tower 2 by means of a cooler in circulating line 33 (not shown) through which the flow of coolant is regulated by liquid level controller 5. Alternatively, the vapors from tower 1 may be completely condensed and introduced into tower 2 as a liquid, in which case heat would have to be supplied to tower 2 to vaporize the product. Fresh aluminum bromide catalyst is supplied to tower 2 through line 17 and line 34 which connects with line 33 and spent catalyst tar is withdrawn from tower 2 via line 35.

Tower 2 is provided with baffle 36 and drip pan 37. Vapor in equilibrium with the liquid in tower 2 passes via overhead line 40 to tower 3 which is operated at a temperature within the range of 175° F. to about 225° F., and from 5° to 35° lower than the temperature in tower 2. The pressure in tower 3 is lower than the pressure maintained in tower 2 and is sufficient to maintain liquid phase operating conditions. As in the case of vapors from tower 2, the vapors in line 40 may be partially condensed or the condenser may be omitted and the liquid level and the temperature in tower 3 may be controlled by cooler 41 in circulating line 42 provided with pump 43. Fresh aluminum bromide catalyst is introduced to tower 3 via lines 17 and 44 and circulating line 42 to replace spent aluminum bromide catalyst which is withdrawn as a tar through line 45. Promoter for the catalyst in towers 1, 2 and 3 may be introduced via lines 47 and 48, 47 and 49, and by line 47 and line 50 which connect with the main feed lines to the respective towers. If desired, the promoter, which may be hydrogen bromide, bromine, alkyl bromide, oxygen or other activator for aluminum bromide catalyst, may be introduced along with the catalyst or directly to the towers independent of the feed stream. However, I prefer to add the activator in a stream separate from the catalyst. If desired, the amount of activator may be adjusted in towers 2 and 3 to at least partially compensate for reduced conversion caused by the higher isobutane content of the reactant and lower temperature of operation in these towers.

The isobutane rich vapor is substantially freed of entrained liquid by baffle 51 in the top of tower 3 and passes via line 60 to condenser 61 through pressure release valve 62 and is fractionated in fractionation system 63. Isobutane and any lower boiling hydrocarbons are withdrawn by line 64 and iso $C_5$ and higher boiling hydrocarbons, if any, are withdrawn through line 65 for incorporation in aviation fuel or motor fuel. Normal butane recycle is withdrawn through line 66 and is recycled to fresh feed line 11. The composition of the recycle stream in line 66 will approximate the composition of the fresh feed stream, that is for example, isobutane approximately 1.5 percent, normal butane 97 percent and isopentane 1.5 percent.

While I have described my process as operating to produce isobutane from a normal butane stream in a three stage reactor system, obviously two or four or more reactors in series may be used. Also, I may isomerize pentanes and even higher boiling normal paraffins by my process. Thus, paraffinic hydrocarbons having boiling points sufficiently low or paraffinic naphthas having distillation endpoints sufficiently low to permit complete vaporization under the conditions of operation of my process, may be isomerized by this improved method. For example, normal paraffins or mixtures thereof from normal butane through normal octane may be processed within the above temperature range and even nonane and decane may be isomerized at higher temperatures at shorter residence time by this method of operation.

As a specific application of the process for converting normal butane to isobutane, I may feed substantially pure normal butane of the above specified composition to tower 1. With a temperature of 200° F. and a residence time of 2 hours in tower 1 the overhead in line 30 will approximate 14.6 mol percent isobutane, 83.9 mol percent normal butane and 1.5 mol percent isopentane. The pressure in line 30 will be approximately 191 pounds per square inch absolute. By converting the condensed vapor product from line 30 in tower 2 at 190° F. and at a pressure of about 173 pounds per square inch the vapor in line 40 will have a composition of approximately 25.9 mol percent isobutane, 72.6 mol percent normal butane and 1.5 mol per cent iso $C_5$ assuming a residence time in tower 2 equal to that in tower 1. By further processing this isobutane enriched product in tower 3 at a temperature of 180° F. and at a pressure of about 155 pounds per square inch for the same residence time, I am able to deliver to fractionator 63 a stream containing approximately 35.7 mol percent isobutane, 62.8 mol percent normal butane and 1.5 percent isopentane. By operating at higher temperatures in the range of about 225° F. to 250° F., I may obtain higher conversion in each zone and deliver to fractionator system 63 a mixture of butanes much richer in isobutane. The choice of temperature of operation of towers 1, 2 and 3 will be governed by the extent of cracking and disproportionation that can be tolerated, as well as by the effect of temperature on catalyst life. Temperatures as high as 250° F. are desirable and even at 275° F. cracking is not extensive if the residence time is held in the lower range of the above limits.

As stated hereinabove my soluble catalyst isomerization process has the advantage of eliminating the necessity of a catalyst recycle step. The conversion in each step may be regulated independently thus allowing the free choice of catalyst concentration and activator concentration. Another advantage of my process lies in the possibility of obtaining a high conversion rate in the first stage in the presence of relatively low isobutane concentration in the liquid and utilizing mild conditions in the latter stage conversion steps where the isobutane concentration is relatively high, thus avoiding disproportionation and cracking. This is made possible by adding catalyst and promoter in separate independent streams to the separate stages. Closely related to this advantage is the advantage obtained by taking low conversion in the first reaction zones of the series and obtaining successively higher isobutane concentration in the overhead products from the succeeding reaction zones, thus building up the isobutane concentration of the isomate in the final effluent passing to the fractionation system and obtaining easier separation of the isobutane in said fractionation system. This desirable concentration gradient of isobutane in the series of reactors is brought about as a result of a dual functioning of the individual reaction zones to the extent that the concentration of isobutane is increased both by the isomerization reaction and as a result of the vaporization. Advantage is taken of the lower boiling point of the isoparaffin product.

Still another advantage of my process is the elimination of catalyst concentration for recycle. As stated hereinabove a concentrated solution of aluminum bromide tends to deposit aluminum bromide in pump packing glands thereby aggravating pump corrosion problems.

Obviously many modifications and variations of the invention, as hereinabove set forth, may be made without departing from the spirit and scope thereof, and therefore only such limitations should be imposed as are indicated in the appended claims.

I claim:

1. A continuous liquid phase stepwise process for isomerizing at least one normal paraffin hydrocarbon containing at least four carbon atoms per molecule in the presence of aluminum bromide catalyst dissolved in said hydrocarbon wherein the reaction is carried out in at least two separate liquid phase stages in a primary reaction zone and in at least one succeeding reaction zone and wherein a mixture of isomerized hydrocarbon and unconverted hydrocarbon is removed in the vapor phase from the hydrocarbon solution of said catalyst in the primary reaction zone for transfer to the next succeeding reaction zone which comprises utilizing at least a part of the heat of condensation of the vapor mixture from said primary reaction zone to maintain the temperature in the next succeeding stage at isomerization conversion level and to vaporize isomerized paraffin hydrocarbon and unreacted normal paraffin hydrocarbon product from the hydrocarbon solution of said catalyst in said succeeding stage by introducing at least a portion of the hydrocarbon removed from the primary zone into the liquid hydrocarbons in the succeeding reaction zone as a vapor without intermediate condensation thereof.

2. A continuous liquid phase multistage isomerization process whereby at least one normal paraffinic hydrocarbon is isomerized to a branched chain hydrocarbon having the same number of carbon atoms as said normal paraffinic hydrocarbon in at least two separate stage reaction zones comprising a primary isomerization zone and at least one additional separate isomerization zone in the presence of aluminum bromide catalyst dissolved in said paraffinic hydrocarbon and in the presence of an activator for said catalyst comprising the steps of (1) continuously feeding to said primary isomerization zone a stream containing said normal paraffinic hydrocarbon, (2) maintaining said hydrocarbon in said primary reaction zone at isomerization temperature and under sufficient pressure to maintain liquid phase contact with said aluminum bromide dissolved in said paraffinic hydrocarbon in said primary reaction zone, (3) continuously vaporizing from said primary reaction zone unreacted normal paraffinic hydrocarbon and branched chain isomerized hydrocarbon product, (4) continuously transferring at least a part of the hydrocarbon vapor formed in step 3 to said separate isomerization zone without intermediate condensation, (5) controlling the proportion of said hydrocarbon vapor of step 4 condensed in the separate reaction zone to maintain the liquified hydrocarbon product in said separate zone at a temperature below the isomerization temperature maintained in the primary reaction zone, (6) adding separate streams of aluminum bromide catalyst and catalyst activator to said separate stage reaction zone, (7) continuously vaporizing from the hydrocarbon solution of aluminum bromide in said separate reaction zone a mixture of hydrocarbon vapors comprising branched chain paraffinic hydrocarbon and unreacted normal paraffinic hydrocarbon, and (8) continuously passing the vaporized hydrocarbon mixture substantially free of aluminum bromide catalyst from step 7 to a fractionation zone to separate a fraction consisting essentially of said branching chain paraffinic hydrocarbon from a fraction consisting essentially of unreacted normal straight chain paraffinic hydrocarbon.

3. A multistage liquid phase catalytic process for the isomerization of at least one normal paraffinic hydrocarbon having at least four carbon atoms and not more than eight carbon atoms per molecule which comprises the steps of (1) passing a liquid stream of said hydrocarbon to the first of a series of reaction zones, (2) introducing to said first reaction zone separate streams of a hydrocarbon solution of aluminum bromide catalyst and an activator for said catalyst, (3) maintaining the temperature in said first reaction zone at isomerization conversion level and maintaining a pressure in said zone sufficient to provide therein liquid phase contact of the hydrocarbons with aluminum bromide catalyst, (4) vaporizing unconverted normal paraffinic hydrocarbon and isomerized paraffinic hydrocarbon from the hydrocarbon solution of aluminum bromide in said first reaction zone, (5) condensing a part of said hydrocarbon vapors from step 4, (6) introducing both the hydrocarbon liquid and the residual vapor product of step 5 into the liquid hydrocarbons in the next succeeding reaction zone, (7) introducing to said next succeeding reaction zone separate streams of hydrocarbon solution of aluminum bromide catalyst and of activator, (8) controlling the heat of condensation available from step 6 by adjusting the extent of condensation of hydrocarbon vapor in step 5 to maintain isomerization conditions of temperature in said next succeeding reaction zone and to furnish the heat for the vaporization of a mixture comprising isomerized paraffinic hydrocarbon and unconverted normal paraffin hydrocarbons from the solution of aluminum bromide in said next succeeding zone, (9) passing the vapor mixture obtained from said succeeding reactor in step 8 to at least one succeeding reaction zone via an intermediate partial condensation step as described in step 5 and processing the vapor-liquid mixture according to the procedure described in steps 6, 7, and 8, and (10) passing the vapor effluent from the final isomerization stage of the process to a fractionation zone for recovery of at least one isomerized hydrocarbon and for separation of at least one normal paraffinic hydrocarbon for recycle to step 1 of the process.

4. A multistage liquid phase catalytic process for the isomerization of normal butane which comprises the steps of: (1) passing a liquid stream of normal butane into the first of a series of packed reaction towers, (2) introducing to said first packed reaction tower separate streams of a butane solution of aluminum bromide catalyst and an activator for said catalyst, (3) maintaining the temperature in said first tower at isomerization conversion level and maintaining a pressure sufficient to maintain the hydrocarbons in the liquid phase, (4) continuously vaporizing normal butane and isobutane product from the hydrocarbon solution of aluminum bromide in said first reaction tower, (5) condensing a part of the hydrocarbon vapors from step 4, (6) introducing both the hydrocarbon liquid condensate of step 5 and the residual vapor product of step 4 into the liquid butanes in the next succeeding reaction tower, (7) introducing into said next succeeding packed reaction tower separate streams of butane solution of aluminum bromide catalyst and activator, (8) controlling the heat of condensation available from step 6 by controlling the extent of condensation of hydrocarbon vapor in step 5 to maintain isomerization conditions of temperature in said succeeding reaction tower and to furnish the heat necessary for the vaporization of the mixture comprising isobutane and normal butane from the butane solution of aluminum bromide, (9) passing the vapor effluent from the final isomerization tower to a fractionation zone for recovery of isobutane.

5. In a continuous liquid phase multi-stage process for the isomerization of normal butane to isobutane in the presence of butane dissolved aluminum bromide catalyst wherein the reaction is carried out in a series of at least two separate stages, the improvement which comprises transferring unreacted normal butane and isobutane product as a vapor mixture substantially free of aluminum bromide catalyst from the primary stage to the secondary stage and absorbing without intermediate condensation at least a part of said vapor mixture in the butane solution of aluminum bromide catalyst in said secondary stage whereby at least a part of the heat of condensation of said vapor mixture is utilized to maintain the temperature in said secondary stage at isomerization conversion level and to separate as a vapor isobutane and unreacted normal butane product from aluminum bromide catalyst in said secondary stage.

6. A continuous liquid phase isomerization process wherein a normal paraffinic hydrocarbon having at least four carbon atoms but not more than eight carbon atoms is converted to the corresponding branched chain hydrocarbon in the presence of dissolved aluminum bromide catalyst in at least two stages comprising a primary isomerization zone and at least one additional separate isomerization zone comprising the successive steps of (1) continuously feeding to said primary isomerization zone a liquid stream containing said normal paraffinc hydrocarbon, (2) maintaining said hydrocarbon in said primary isomerization zone at a temperature sufficiently high to isomerize a part of said normal paraffinic hydrocarbon and under sufficient pressure to maintain liquid phase contact with said aluminum bromide dissolved in said paraffinic hydrocarbon in said primary reaction zone, (3) continuously vaporizing liquid product comprising unreacted normal paraffinic hydrocarbon feed and branched chain isomerized product from said hydrocarbon solution of aluminum bromide in said primary reaction zone, (4) transferring the hydrocarbons vaporized in step 3 to said separate isomerization zone, (5) maintaining said transferred hydrocarbon in said separate isomerization zone in liquid phase at a temperature and pressure below the temperature and pressure maintained in said primary isomerization zone and in the presence of dissolved aluminum bromide separately added to said additional separate isomerization zone, (6) continuously vaporizing a mixture of isomerized hydrocarbon and unreacted normal paraffinic hydrocarbon from the liquid in said separate isomerization zone, and (7) passing the vaporized mixture from step 6 to a fractionation zone for separation of a fraction comprising predominantly branched chain hydrocarbon from a fraction comprising predominantly normal straight chain paraffinic hydrocarbon.

7. The process as described in claim 6 wherein at least a part of the heat of condensation of the vapor from the primary isomerization zone is used in direct heat transfer to maintain the temperature in said separate isomerization zone and to evaporate the mixture of isomerized hydrocarbon and normal paraffin hydrocarbon from the liquid in said separate isomerization zone.

8. The process as described in claim 6 characterized by the added improvement comprising the separate addition to the isomerization zones of aluminum bromide catalyst promoter.

9. In a continuous multi-stage process for the isomerization of at least one normal paraffin hydrocarbon by means of a catalyst soluble in said paraffin hydrocarbon under isomerization conditions wherein the reaction is carried out in a series of at least two separate isomerization zones in the liquid phase, the improvement which comprises vaporizing the partially isomerized mixture of paraffin hydrocarbons in each reaction zone for transfer to the next succeeding zone and maintaining and controlling the level of liquid hydrocarbons in any isomerization zone following the primary isomerization zone by condensing at least a part of the vapor mixture of hydrocarbons from the next preceding isomerization zone of the series and withdrawing at least a part of the heat of condensation before passing the hydrocarbons to the succeeding isomerization zone in which said liquid hydrocarbon level is maintained and controlled.

WILL SWERDLOFF.

REFERENCES CITED

The following references are of record in the file of this patent:

UNITED STATES PATENTS

| Number | Name | Date |
|---|---|---|
| 2,349,516 | Pines et al. | May 23, 1944 |
| 2,366,028 | Henry | Dec. 26, 1944 |